(12) United States Patent
Sobot et al.

(10) Patent No.: US 12,204,663 B2
(45) Date of Patent: Jan. 21, 2025

(54) ACCESS CONTROL FOR ON-DEVICE MACHINE LEARNING MODELS

(71) Applicant: Spotify AB, Stockholm (SE)

(72) Inventors: Peter Milan Thomson Sobot, Brooklyn, NY (US); David Samuel Rubinstein, Brooklyn, NY (US)

(73) Assignee: Spotify AB, Stockholm (SE)

( * ) Notice: Subject to any disclaimer, the term of this patent is extended or adjusted under 35 U.S.C. 154(b) by 369 days.

(21) Appl. No.: 17/241,383

(22) Filed: Apr. 27, 2021

(65) Prior Publication Data

US 2022/0343004 A1   Oct. 27, 2022

(51) Int. Cl.
*G06F 21/62* (2013.01)
*G06N 20/00* (2019.01)

(52) U.S. Cl.
CPC .......... *G06F 21/62* (2013.01); *G06N 20/00* (2019.01)

(58) Field of Classification Search
CPC ................... G06F 21/60–629; G06N 20/00
See application file for complete search history.

(56) References Cited

U.S. PATENT DOCUMENTS

| 10,956,584 | B1* | 3/2021 | Heaton | G06F 9/3802 |
| 2014/0331294 | A1* | 11/2014 | Ramallo | G06F 21/6245 726/16 |
| 2017/0012969 | A1* | 1/2017 | Li | H04W 12/06 |
| 2018/0349577 | A1 | 12/2018 | Goldwasser et al. | |
| 2019/0205508 | A1* | 7/2019 | Poddar | G06N 3/045 |
| 2020/0202167 | A1* | 6/2020 | Gross | G06V 10/87 |
| 2020/0311540 | A1 | 10/2020 | Chakraborty | |
| 2021/0014039 | A1* | 1/2021 | Zhang | H04L 9/0618 |

(Continued)

FOREIGN PATENT DOCUMENTS

| CN | 109040091 A | * 12/2018 |
| CN | 112698848 A | * 4/2021 |

OTHER PUBLICATIONS

A. Chakraborty, A. Mondai and A. Srivastava, "Hardware-Assisted Intellectual Property Protection of Deep Learning Models," 2020 57th ACM/IEEE Design Automation Conference (DAC), San Francisco, CA, USA, 2020, pp. 1-6, doi: 10.1109/DAC18072.2020. 9218651. (Year: 2020).*

(Continued)

*Primary Examiner* — Madhuri R Herzog
(74) *Attorney, Agent, or Firm* — McDonnell Boehnen Hulbert & Berghoff LLP

(57) ABSTRACT

A system and method for controlling access to an on-device machine learning model without the use of encryption is described herein. For example, a request is received from an application executing on a device of a user. The request is to download a machine learning model to the device that enables a feature of the application, and the request includes information associated with the user and/or the device. The information is used to create an obfuscation key, and a derivative model can be generated using a reference copy of the machine learning model and the obfuscation key. The derivative model and the obfuscation key are then sent to the application. When the obfuscation key is provided to the derivative model at runtime, values derived from the obfuscation key are provided as additional inputs that enable the derivative model to function properly.

20 Claims, 9 Drawing Sheets

(56) References Cited

U.S. PATENT DOCUMENTS

2022/0197981 A1* 6/2022 Marson ............... G06F 21/14

OTHER PUBLICATIONS

Zou, Minhui, et al. "Security enhancement for rram computing system through obfuscating crossbar row connections." 2020 Design, Automation & Test in Europe Conference & Exhibition (Date). IEEE, 2020. (Year: 2020).*
Wang Y, Jin S, Li T. A low cost weight obfuscation scheme for security enhancement of ReRAM based neural network accelerators. InProceedings of the 26th Asia and South Pacific Design Automation Conference Jan. 18, 2021 (pp. 499-504). (Year: 2021).*
Isakov et al. "Preventing Neural Network Model Exfiltration in Machine Learning Hardware Accelerators." IEEE (2018), pp. 62-67.

* cited by examiner

ACCESS CONTROL FOR ON-DEVICE MACHINE LEARNING MODELS

BACKGROUND

Many applications use machine learning models to classify, describe, generate or process information. Such machine learning models can be applied on devices, servers that are remote from the devices, or a combination of both. Implementing an application on a device is referred to as "on-device" whereas implementing the application on a server is referred to as "on-server" or "cloud-based". An on-device inference is the process of making predictions using a trained model which will run on the device. On-device inference is becoming more popular due to its lower latency and increased privacy when compared to an on-server/cloud-based paradigm. For at least these reasons it is preferable in certain use cases to apply the machine learning models on a device rather than on-server on the cloud.

However, existing methods for applying machine learning models on-device can still leave the models vulnerable to being extracted and copied. It can also result in uncontrolled use of the models. Traditionally, encryption methods were implemented to protect against such extraction and control. Typical encryption methods obscure the structure of the model that altogether prevents the operation of the model unless an encryption key or an encryption primitive is available to the device. However, these types of encryption methods require significant computational processing. Further, using encryption to protect data can sometimes lead to legal requirements relating to export (e.g., International Traffic in Arms Regulations (ITAR) restrictions).

SUMMARY

In general terms, this disclosure is directed to a system and method for controlling access to on-device machine learning models without encryption. In one possible configuration and by non-limiting example, a derivative of the machine learning model is generated based on an obfuscation key that is created using information specific to a user and a device on which an application whose feature requires the machine learning model is running. The derivative of the model and the obfuscation key are then provided to the application to enable the device to run the derivative model by providing the obfuscation key to the derivative model at runtime.

Various aspects are described in this disclosure, which include, but are not limited to, the following aspects.

In one aspect, a method for controlling access to an on-device machine learning model is described. An example method includes receiving, from an application executing on a device of a user, a request to download a machine learning model to the device for enabling a feature of the application. The request can include information associated with the user and the device. The example method also includes creating an obfuscation key based on the information included in the request, and generating a derivative model using a reference copy of the machine learning model and the obfuscation key. The derivative model can be generated by: including one or more obfuscation parameters as inputs to the reference copy of the machine learning model, where each of the one or more obfuscation parameters having an assigned value derived from the obfuscation key; modifying one or more weights of the reference copy of the machine learning model with the assigned value of a respective obfuscation parameter; and for each of the one or more modified weights, adding an operation to apply to the modified weight and a received input for the respective obfuscation parameter. The example method can further include sending the derivative model and the obfuscation key to the application.

In another aspect, a server for controlling access to an on-device machine learning model is described. An example server includes at least one processing device, and a memory coupled to the processing device the stores instructions. When the instructions are executed by the processing device, the processing device is caused to receive, from an application executing on a device of a user, a request to download a machine learning model to the device for enabling a feature of the application. The request can include information associated with the user and the device. The processing device can also be caused to create an obfuscation key based on the information included in the request, and generate a derivative model using a reference copy of the machine learning model and the obfuscation key. The derivative model can be generated by: including one or more obfuscation parameters as inputs to the reference copy of the machine learning model, where each of the obfuscation parameters have an assigned value derived from the obfuscation key; modifying one or more weights of the reference copy of the machine learning model with the assigned value of a respective obfuscation parameter; and for each of the one or more modified weights, adding an operation to apply to the modified weight and a received input for the respective obfuscation parameter. The processing device can then further be caused to send the derivative model and the obfuscation key to the application.

In a further aspect, example non-transitory computer readable storage media storing executable instructions are described. The instructions, when executed by at least one processing device, cause the processing device to receive, from an application executing on a device of a user, a request to download a machine learning model to the device for enabling a feature of the application. The request can include information associated with the user and the device. The processing device can also be caused to create an obfuscation key based on the information included in the request, and generate a derivative model using a reference copy of the machine learning model and the obfuscation key. The derivative model can be generated by: including one or more obfuscation parameters as inputs to the reference copy of the machine learning model, where each of the obfuscation parameters have an assigned value derived from the obfuscation key; modifying one or more weights of the reference copy of the machine learning model with the assigned value of a respective obfuscation parameter; and for each of the one or more modified weights, adding an operation to apply to the modified weight and a received input for the respective obfuscation parameter. The processing device can then further be caused to send the derivative model and the obfuscation key to the application.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

Figure 1:
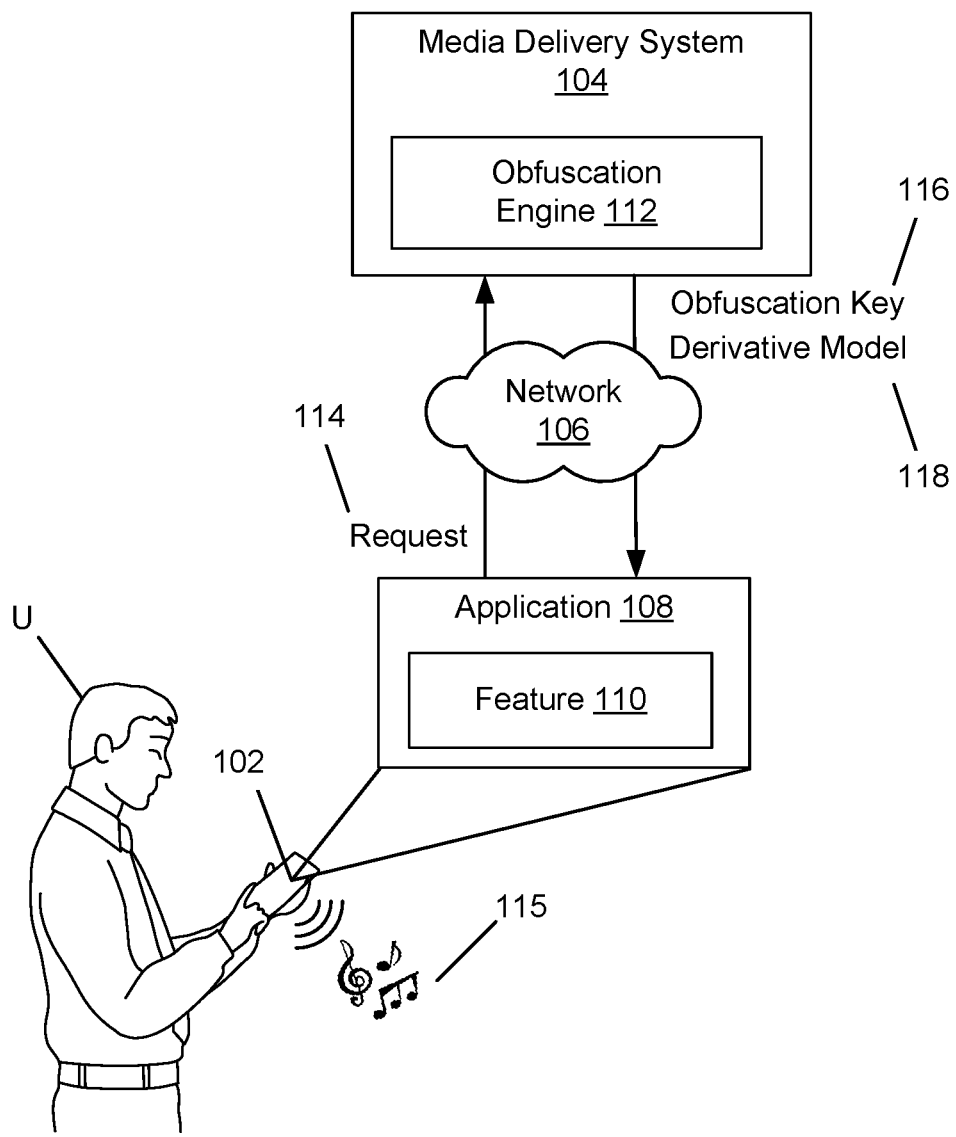
FIG. 1 illustrates an example system for providing an access-controlled, on-device machine learning model.

Various embodiments will be described in detail with reference to the drawings, wherein like reference numerals represent like components throughout the several views. Reference to various embodiments does not limit the scope of the claims attached hereto. Additionally, any examples set forth in this specification are not intended to be limiting and merely set forth some of the many possible embodiments for the appended claims.

The embodiments described herein provide systems and methods for controlling access to on-device machine learning models, which are now described herein in terms of an example system that enables access control without the need for encryption to protect against replication and to effectively manage interests associated with use of the models. This description is not intended to limit the application of the example embodiments presented herein. In fact, after reading the following description, it will be apparent to one skilled in the relevant art(s) how to implement the following example embodiments in alternative embodiments (e.g., involving an on-device application using a machine learning model to perform inferences based on select data provided as input).

An application as used herein is a sequence of instructions, which when executed by one or more processors, cause the one or more processors to perform processes to achieve a desired result. An on-device application can cause the device to perform various functions. The portion of an application which causes the device to perform a particular function is referred to herein as a "feature". In some examples, a feature of the application uses a machine learning model.

In an example embodiment, a server that is remote from the device receives a request from an on-device application including a feature that uses a machine learning model. In response to the request received from the application, the remote system generates a derivative of the model based on an obfuscation key. An obfuscation key as used herein is the transformation of a human-readable string to a string that, although still readable by a human, is difficult for people to understand or decipher the information from which values of the string are derived. In contrast to encryption, obfuscation includes no cryptographic key and the "secret" here is the operation itself. An encryption key is used to actually transform the contents of a file, making it unreadable to anyone unless they apply a special decryption key.

In some embodiments, the obfuscation key is generated by the remote server, for example by an obfuscation engine. In turn, the derivative model and the obfuscation key are provided to the application by the remote server (e.g., via a network) for storage on a device executing the application. One common issue with using encryption to encrypt a model is that the encryption obscures the structure of the model. In contrast to encryption, the obfuscation key-based modifications made to the machine learning model to generate the derivative model according to this example embodiment do not obscure the structure of the model. As a result, the model in its derivative state is operational on the device even without the obfuscation key. The obfuscation key-based modifications to the model instead affect the quality or accuracy of the output of the derivative model (e.g., affect the predictions made based on the input data) to the extent the obfuscation key is available and applied at runtime. In other words, the derivative model is always operational to process the input data, but only practically useful (e.g., to achieve quality or accurate output) if the obfuscation key is available and applied to the derivative model at runtime.

Additionally, the derivative model is persistently stored on the device, while the obfuscation key is only temporarily stored. For example, once the application is terminated (e.g., closed), the obfuscation key is removed from the device memory. As a result, each subsequent time the application is run, the obfuscation key has to be re-created and sent to the application, providing an additional form of access control. As one example, a determination can be made as to whether access to the feature, and thus use of the model, is still available to a user associated with the device before re-creating the obfuscation key.

Further, the obfuscation key is created based on user- and/or device-specific information that is sent within the application request, such as a user identifier tied to a user account associated with a service providing the application and a device identifier. Thus, if the derivative model was extracted and copied, when an unauthorized user (e.g., not tied to the user account) executes the model on a different device the application cannot provide the same user and device information within the request. As a result, the same obfuscation key that was used to generate the derivative model cannot be generated and provided to the application, which renders the extracted and copied derivative model practically useless although operational.

FIG. 1 illustrates an example system 100 for providing an access-controlled, on-device machine learning model. In this example, the system 100 includes a media playback device 102 and a media delivery system 104. The system 100 communicates across a network 106. The media delivery system 104 can be associated with a media service that provides a plurality of applications having various features that can be accessed via media playback devices such as the media playback device 102. In some embodiments, an application 108 that includes a feature 110 runs on the media playback device 102, and an obfuscation engine 112 runs on the media delivery system 104.

In some examples, the feature 110 of the application 108 is enabled by a machine learning model. The machine learning model can include a supervised or unsupervised model. If the machine learning model is supervised, the model can be a regression model or a classification model. Example regression models can include a linear regression model or one of a decision tree model, a random forest model, or a neural network with continuous output. Example classification models can include a logistic regression, a support vector machine, Naive Bayes, or one of a decision tree model, a random forest model, or a neural network with discrete output. If the machine learning model is unsupervised, the model can use clustering or dimensionality reduction techniques. Example clustering techniques include k-means clustering, hierarchical clustering, mean shift clustering, and density based clustering. Example dimensionality reduction techniques can include feature elimination or feature extraction techniques.

In some embodiments, the machine learning model is to be run by the application 108 locally on the media playback device 102 rather than remotely by media delivery system 104. In such embodiments, the machine learning model can be referred to as an "on-device" model. Various reasons for implementing an on-device model include data or latency constraints and/or for consumer privacy. As one example, the machine learning model when run on the media playback device 102 can provide a faster, improved user experience (e.g., reduce latency).

Accordingly, in instances when the machine learning model is to be an on-device model, the application 108 can provide a request 114 over the network 106 to the media delivery system 104 to download the machine learning model to the device to enable the feature 110. In some examples, the request 114 is provided in response to opening or executing the application 108 on the media playback device 102. In other examples, the request 114 is provided in response to a selection of the feature 110. The request 114 can include user- and/or device-specific information.

Also shown is a user U who uses the media playback device 102 to access the application 108 and features thereof, including the feature 110. As a non-limiting, non-exclusive example, the application 108 is an audio application and the feature 110 enables the user U to select one or more media content items via the application 108, which are provided as input to the machine learning model. In some examples, the media playback device 102 can also operate to enable playback of one or more media content items to produce media output 115.

In some embodiments, the media content items are provided by the media delivery system 104 and transmitted to the media playback device 102 using the network 106. In further embodiments, the media content items are initially recorded by the media playback device 102 and provided to the media delivery system 104 for storage. A media content item is an item of media content, including audio, video, or other types of media content, which are stored in any format suitable for storing media content. Non-limiting examples of media content items include sounds, songs, albums, music videos, movies, television episodes, podcasts, other types of audio or video content, and portions or combinations thereof.

The media delivery system 104 operates to provide the media content items to the media playback device 102. In some embodiments, the media delivery system 104 is connectable to a plurality of media playback devices 102 and provides the media content items to the media playback devices 102 independently or simultaneously. Additionally, responsive to receiving the request 114 from the application 108 over the network 106, the media delivery system 104 operates to provide the machine learning model to the application 108 to enable the machine learning model to be run on the media playback device 102.

In some embodiments, to enable access control for the machine learning model once provided to the application 108, the obfuscation engine 112 generates a derivative of the machine learning model (e.g., a derivative model 118) using a reference copy of the machine learning model stored at the media delivery system 104 and an obfuscation key 116, where the obfuscation key 116 is created based on the user- and/or device-specific information provided in the request 114. The derivative model 118 is then provided with the obfuscation key 116 to the application 108 to enable the media playback device 102 to run the derivative model 118 by providing the obfuscation key 116 at runtime.

Resultantly, access to the machine learning model is controlled by serving a unique derivative of the machine learning model to each user that is generated based on a user- and/or device-specific obfuscation key, where for the derivative model to function properly (e.g., behave as expected), values derived from a corresponding obfuscation key are provided as input at runtime.

As introduced above, in one non-limiting, non-exclusive example, the application 108 is an audio application and one or more media content items are provided as input to the machine learning model. Further, the media content items can include audio data comprised of one or more audio components. Continuing with that example, when values derived from the obfuscation key 116 are provided as input to the derivative model 118 along with the audio data, the derivative model 118 functions properly and provides desired audio output based on the one or more audio components of the audio data input. However, if only a portion of the values derived from the obfuscation key 116 are provided as input (e.g., because only a portion of the obfuscation key 116 is available) or completely random values are provided as input to the derivative model 118 along with the audio data, the derivative model 118 functions improperly and instead outputs audio that increasingly diverges from the desired audio output as the values provided as input increasingly diverge from the values derived from the obfuscation key 116. In other words, the derivative model 118 still operates but is rendered practically useless as the derivative model functions improperly and outputs audio of lesser quality and/or accuracy. For example, the audio output can include no audio at all (e.g., silence), distortion, random artifacts, or random noise, among other examples.

Figure 2:
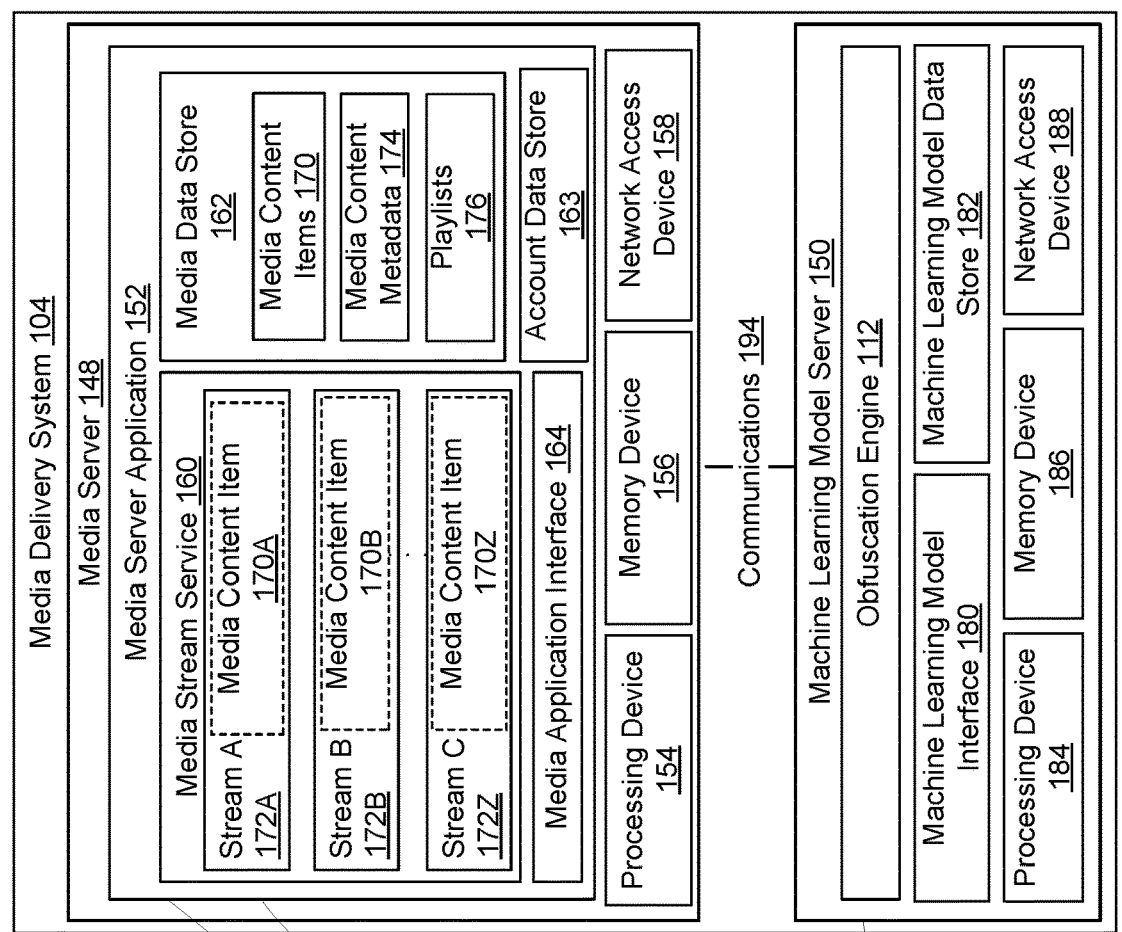
FIG. 2 illustrates an example system for controlling access to an on-device machine learning model.
Figure 2:
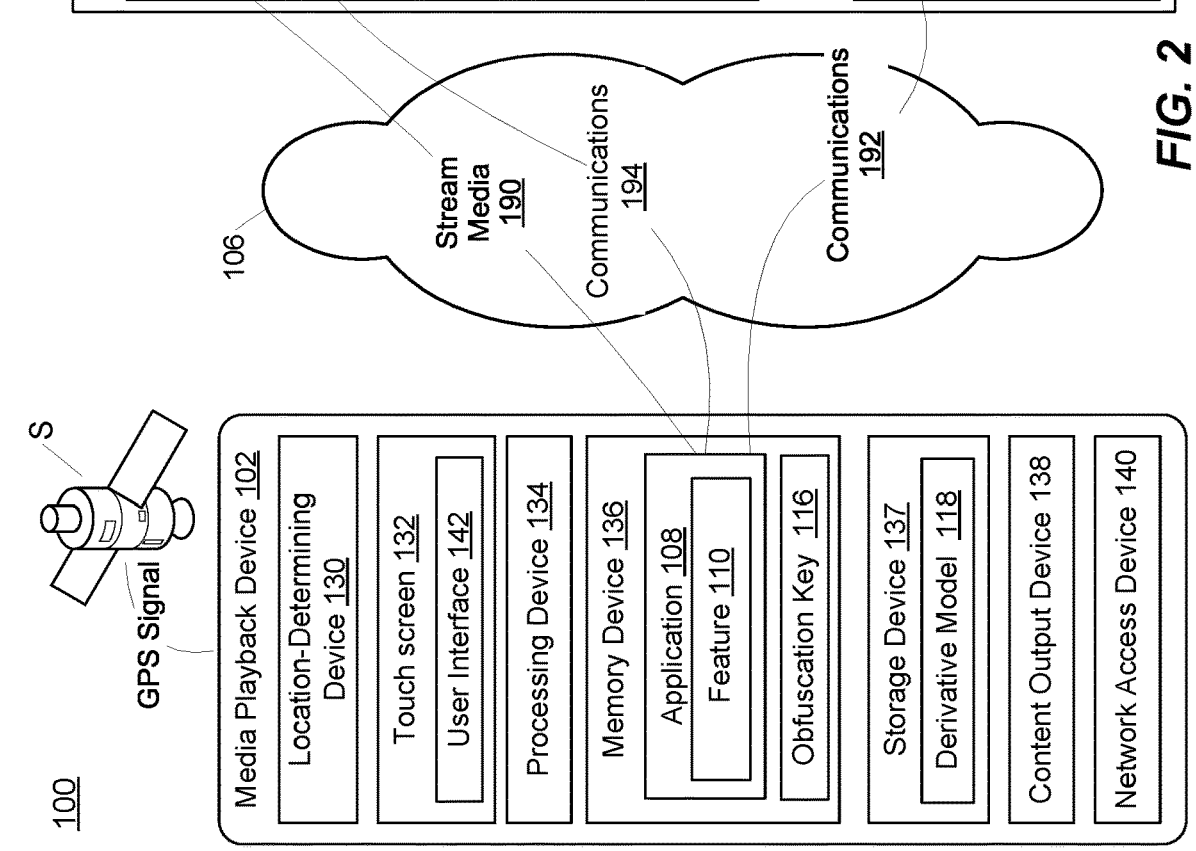

FIG. 2 illustrates an example system for controlling access to an on-device machine learning model. As described herein, the media playback device 102 operates to execute the application 108, where the application 108 includes at least feature 110 and a machine learning model running on the media playback device 102 is used to enable the feature 110. In some embodiments, the application 108 can be one of a plurality of applications provided by a media service associated with the media delivery system 104. A thin version of the application 108 (e.g., a web application accessed via a web browser operating on the media playback device 102) or a thick version of the application (e.g., a locally installed application on the media playback device 102) can be executed.

As one non-limiting and non-exhaustive example, the application 108 is an audio application and the feature 110 allows selection of one or more media content items that are provided as input to the machine learning model in order to receive desired output. In some embodiments, the media content items are provided (e.g., streamed, transmitted, etc.) by a system external to the media playback device such as the media delivery system 104, another system, or a peer device. Alternatively, in some embodiments, the media playback device 102 stores the media content items locally on the media playback device 102. Further, in at least some embodiments, the media playback device 102 provides as input to the machine learning model media content items that are stored locally as well as media content items provided by other systems.

In some embodiments, the media playback device 102 is a computing device, handheld entertainment device, smartphone, tablet, watch, wearable device, or any other type of device capable of executing applications such as application 108. In yet other embodiments, the media playback device 102 is a laptop computer, desktop computer, television, gaming console, set-top box, network appliance, blu-ray or DVD player, media player, stereo, or radio.

In at least some embodiments, the media playback device 102 includes a location-determining device 130, a touch screen 132, a processing device 134, a memory device 136, a storage device 137, a content output device 138, and a network access device 140. Other embodiments may include additional, different, or fewer components. For example, some embodiments may include a recording device such as a microphone or camera that operates to record audio or video content. As another example, some embodiments do not include one or more of the location-determining device 130 and the touch screen 132.

The location-determining device 130 is a device that determines the location of the media playback device 102. In some embodiments, the location-determining device 130 uses one or more of the following technologies: Global Positioning System (GPS) technology which may receive GPS signals from satellites, cellular triangulation technology, network-based location identification technology, Wi-Fi positioning systems technology, and combinations thereof.

The touch screen 132 operates to receive an input from a selector (e.g., a finger, stylus etc.) controlled by the user U. In some embodiments, the touch screen 132 operates as both a display device and a user input device. In some embodiments, the touch screen 132 detects inputs based on one or both of touches and near-touches. In some embodiments, the touch screen 132 displays a user interface 142 for interacting with the media playback device 102. As noted above, some embodiments do not include a touch screen 132. Some embodiments include a display device and one or more separate user interface devices. Further, some embodiments do not include a display device.

In some embodiments, the processing device 134 comprises one or more central processing units (CPU). In other embodiments, the processing device 134 additionally or alternatively includes one or more digital signal processors, field-programmable gate arrays, or other electronic circuits.

The memory device 136 operates to store data and instructions. In some embodiments, the memory device 136 stores instructions for the application 108 having the feature 110. Additionally, a user profile associated with application 108 and/or the media service can be stored that includes at least a user identifier. The memory device 136 can also temporarily store an obfuscation key 116 provided by the media delivery system 104 while the application 108 is running (e.g., executing on) the media playback device 102 such that the obfuscation key 116 can be provided to the derivative model 118 at runtime upon selection of the feature 110. However, once the application 108 is closed (e.g. is no longer executing) on the media playback device 102, the obfuscation key 116 is erased.

In some embodiments, the media playback device 102 can include one or more additional storage devices, including storage device 137. The storage device 137 can persistently store a derivative model 118 generated and provided by the media delivery system 104. For example, the derivative model 118 can be downloaded and saved as a file in the storage device 137. In some examples, a device profile including information about the media playback device 102 itself, such as a device identifier, can also be stored.

Computer readable media include any available media that can be accessed by the media playback device 102. By way of example, the term computer readable media as used herein includes computer readable storage media and computer readable communication media.

The memory device 136 and the storage device 137 are computer readable storage media examples (e.g., memory storage). Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blu-ray discs, digital versatile discs or other optical storage, magnetic cassettes, magnetic tape, magnetic disk storage or other magnetic storage devices, or any other medium that can be used to store the desired information and that can be accessed by the media playback device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 138 operates to output media content. In some embodiments, the content output device 138 generates media output 115 (FIG. 1) for the user U. Examples of the content output device 138 include a speaker, an audio output jack, a BLUETOOTH® transmitter, a display panel, and a video output jack. Other embodiments are possible as well. For example, the content output device 138 may transmit a signal through the audio output jack or BLUETOOTH® transmitter that can be used to reproduce an audio signal by a connected or paired device such as headphones or a speaker.

The network access device 140 operates to communicate with other computing devices over one or more networks, such as the network 106. Examples of the network access device include wired network interfaces and wireless network interfaces. Wireless network interfaces include infrared, BLUETOOTH® wireless technology, 802.11a/b/g/n/ac, and cellular or other radio frequency interfaces in at least some possible embodiments.

The feature 110 of the application 108 operates to allow the user U to select one or more media content items that are provided as input to the machine learning model in order to receive desired output. As described herein, the application 108 is configured to communicate with the media delivery system 104 to receive one or more media content items (e.g., through the stream media 190), as well as the obfuscation key 116 and the derivative model 118 that is generated based on a reference copy of the machine learning model and the obfuscation key 116 by the media delivery system 104 (e.g., through communications 192).

With still reference to FIG. 2, the media delivery system 104 includes one or more computing devices and operates to provide media content items to the media playback device 102 and, in some embodiments, other media playback devices as well. In some embodiments, the media delivery system 104 operates to transmit the stream media 190 to media playback devices such as the media playback device 102.

In some embodiments, the media delivery system 104 includes a media server 148 and a machine learning model server 150. In this example, the media server 148 includes a media server application 152, a processing device 154, a memory device 156, and a network access device 158. The processing device 154, memory device 156, and network access device 158 may be similar to the processing device 134, memory device 136, and network access device 140 respectively, which have each been previously described.

In some embodiments, the media server application 152 operates to stream music or other audio, video, or other forms of media content. The media server application 152 includes a media stream service 160, a media data store 162, and a media application interface 164.

The media stream service 160 operates to buffer media content such as media content items 170 (including 170A, 170B, and 170Z) for streaming to one or more streams 172A, 172B, and 172Z.

The media application interface 164 can receive requests or other communication from media playback devices or other systems, to retrieve media content items from the media delivery system 104. For example, in FIG. 2, the media application interface 164 receives communications 194 from the media playback device 102. In some aspects, the media content items requested to be retrieved include the one or more media content items selected by the user U utilizing the feature 110 of the application 108, where those selected media content items are to be provided as input to the machine learning model.

In some embodiments, the media data store 162 stores media content items 170, media content metadata 174, and playlists 176. The media data store 162 may comprise one or more databases and file systems. Other embodiments are possible as well. As noted above, the media content items 170 may be audio, video, or any other type of media content, which may be stored in any format for storing media content.

The media content metadata 174 operates to provide various pieces of information associated with the media content items 170. In some embodiments, the media content metadata 174 includes one or more of title, artist name, album name, length, genre, mood, era, etc. In addition, the media content metadata 174 includes acoustic metadata which may be derived from analysis of the track. Acoustic metadata may include temporal information such as tempo, rhythm, beats, downbeats, tatums, patterns, sections, or other structures. Acoustic metadata may also include spectral information such as melody, pitch, harmony, timbre, chroma, loudness, vocalness, or other possible features.

The playlists 176 operate to identify one or more of the media content items 170. In some embodiments, the playlists 176 identify a group of the media content items 170 in a particular order. In other embodiments, the playlists 176 merely identify a group of the media content items 170 without specifying a particular order. Some, but not necessarily all, of the media content items 170 included in a particular one of the playlists 176 are associated with a common characteristic such as a common genre, mood, or era.

In some embodiments, the media server application 152 can also include one or more additional data stores, such as an account data store 163. The account data store 163 can comprise one or more databases and file systems. The account data store 163 can include data specific to each of a plurality of user accounts associated with the media service. For example, for each user account, a user account identifier, one or more particular user identifiers and/or a device identifier associated with the user account can be stored, among other examples. Information such as an account password and a subscription type can also be stored.

In this example, the machine learning model server 150 includes the obfuscation engine 112, a machine learning model interface 180, a machine learning model data store 182, a processing device 184, a memory device 186, and a network access device 188. The processing device 184, memory device 186, and network access device 188 may be similar to the processing device 134, memory device 136, and network access device 140 respectively, which have each been previously described.

The obfuscation engine 112 operates to generate a derivative of the machine learning model (e.g., the derivative model 118) using a reference copy of the machine learning model and a created obfuscation key (e.g., obfuscation key 116). The derivative model 118 is then provided with the obfuscation key 116 to the application 108. The derivative model 118 is generated responsive to receipt of a request (e.g., request 114 shown in FIG. 1) to download the machine learning model from the application 108 through communications 192. In some examples, the request 114 is received in response to the application 108 being opened or executed on the media playback device 102. In other examples, the request 114 is received in response to a selection of the feature 110 of the application 108 that the machine learning model enables. The request 114 can include user- and/or device-specific information that is used by the obfuscation engine 112 to create the obfuscation key 116. In some examples, the information included in the request 114 is obtained by the application 108 from a user profile associated with application 108 and/or the media service and a device profile stored on the media playback device 102 (e.g., in memory device 136 and/or storage device 137). In other examples, the information can be obtained from a data store of the media server 148 (e.g., from account data store 163).

In some embodiments, upon provision to the application 108, the derivative model 118 is persistently stored by the storage device 137 of the media playback device 102, while the obfuscation key 116 is only temporarily stored and then erased from the memory device 136 of the media playback device 102 once the application 108 is closed. Accordingly, the obfuscation engine 112 can receive additional requests similar to the request 114 each time the application 108 is subsequently opened on the media playback device 102 (or alternatively each time the feature 110 is subsequently selected). The additional requests include the same user- and/or device-specific information that was included in the request 114. This same information is again used by the obfuscation engine 112 to create the obfuscation key 116 for provision to the application 108.

The machine learning model interface 180 can receive requests or other communication from other systems. For example, the machine learning model interface 180 receives the request 114 from the application 108 through the communications 192. In some examples, the machine learning model interface 180 also facilitates transmission of the obfuscation key 116 and the derivative model 118 to the application 108 through the communications 192. Additionally, the machine learning model interface 180 receives the one or more additional requests from the application 108 through the communications 192 that cause the obfuscation engine 112 to again create and provide the obfuscation key 116 to the application 108.

In some embodiments, the machine learning model data store 182 stores reference copies of a plurality of machine learning models that are utilized to enable various features of a plurality of applications (e.g., the applications provided by the media service associated with the media delivery system 104). The reference copies stored in the machine learning model data store 182 include a reference copy of the machine learning model used to enable the feature 110 of the application 108. Additionally, the machine learning model data store 182 can store, for each machine learning model, the user- and/or device-specific information received in requests to log and track which user accounts and devices associated with the user accounts have requested and received derivatives of the machine learning models. The machine learning model data store 182 may comprise one or more databases and file systems. Other embodiments are possible as well.

Referring still to FIG. 2, the network 106 is an electronic communication network that facilitates communication between the media playback device 102 and the media delivery system 104. An electronic communication network includes a set of computing devices and links between the computing devices. The computing devices in the network use the links to enable communication among the computing devices in the network. The network 106 can include routers, switches, mobile access points, bridges, hubs, intrusion detection devices, storage devices, standalone server devices, blade server devices, sensors, desktop computers, firewall devices, laptop computers, handheld computers, mobile telephones, and other types of computing devices.

In various embodiments, the network 106 includes various types of links. For example, the network 106 can include wired and/or wireless links, including BLUETOOTH®, ultra-wideband (UWB), 802.11, ZigBee, cellular, and other types of wireless links. Furthermore, in various embodiments, the network 106 is implemented at various scales. For example, the network 106 can be implemented as one or more local area networks (LANs), metropolitan area networks, subnets, wide area networks (such as the Internet), or can be implemented at another scale. Further, in some embodiments, the network 106 includes multiple networks, which may be of the same type or of multiple different types.

Although FIG. 2 illustrates only a single media playback device 102 communicable with a single media delivery system 104, in accordance with some embodiments, the media delivery system 104 can support the simultaneous use of multiple media playback devices, and the media playback device 102 can simultaneously interact with multiple media delivery systems. Additionally, although FIG. 2 illustrates a streaming media-based system, other embodiments are possible as well.

While FIGS. 1 and 2 describe example audio-based applications executing on media playback devices that are interacting with a media delivery system associated with a media service, the types of applications having features that use machine learning models and associated systems in which access-controlled, on-device machine learning models can be implemented are not so limited.

Figure 3:
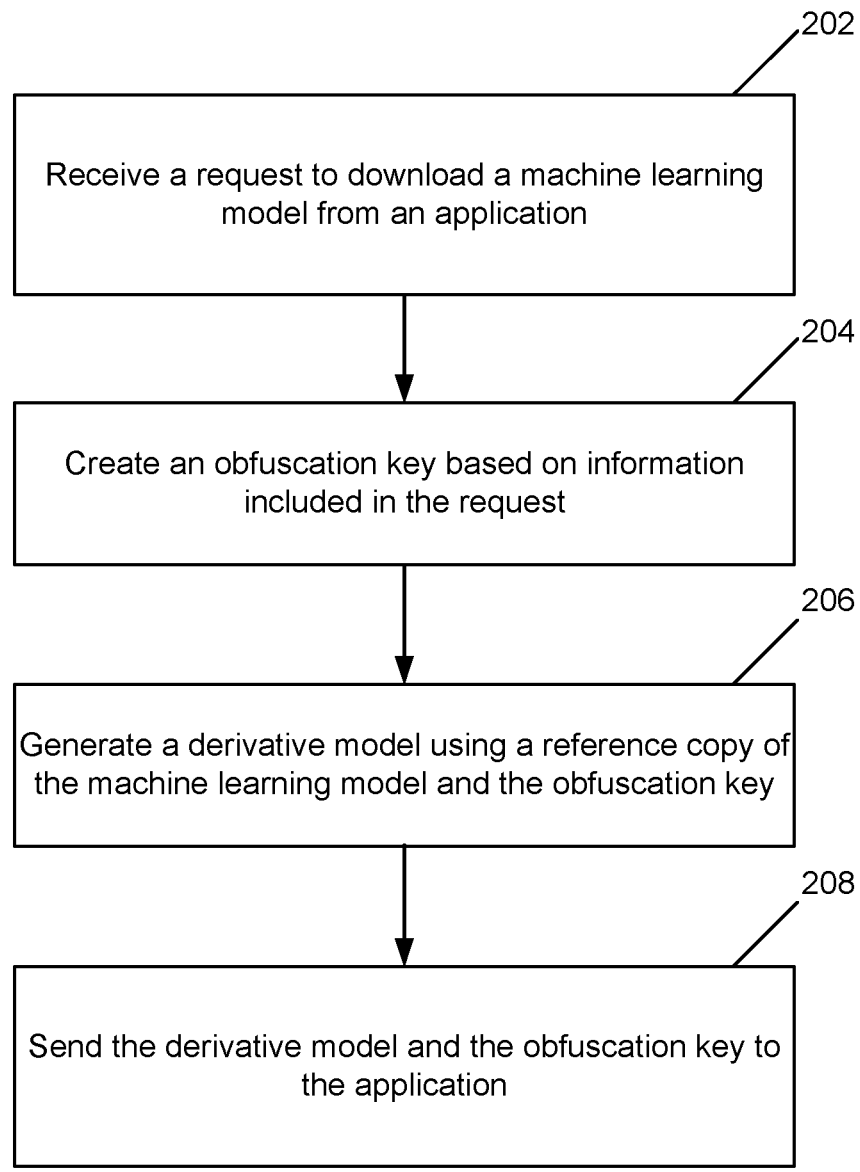
FIG. 3 illustrates an example method for controlling access to an on-device machine learning model

FIG. 3 illustrates an example method 200 for controlling access to an on-device machine learning model. In this example, the method 200 is described as being performed by the obfuscation engine 112 of the media delivery system 104 as described in FIG. 1 and FIG. 2. A media service associated with the media delivery system 104 can provide services and/or various features thereof to devices associated with user accounts of the media service having particular subscription types. Examples of the subscription types include a free subscription and a fee-based subscription with a single tier or with multiple tiers. Such a fee-based subscription can provide services or features that the free subscription does not provide.

The method can begin at operation 202, where a request to download a machine learning model is received from an application such as the request 114 received from the application 108 having the feature 110 that is executing on the media playback device 102 described in detail with reference to FIG. 1 and FIG. 2. The application can be an example means by which a service is provided by the media service.

The request 114 can be received in response to the opening of the application 108 on the media playback device 102 such that the machine learning model is downloaded to the media playback device 102 in advance of a selection of the feature 110 of the application 108 that uses the machine learning model. By downloading the machine learning model in advance, the machine learning model can be run and thus the feature 110 can be executed immediately upon being selected, which improves user experience. Alternatively, the request 114 can be received in response to the selection of the feature 110. While a slight delay can be experienced while the machine learning model is downloaded at runtime, such a trigger downloads the machine learning model only if the particular feature that uses the machine learning model is selected. By basing download on need, processing requirements of the obfuscation engine 112 and/or storage requirements of the media playback device 102 can be reduced in instances where that particular feature 110 of the application 108 is not utilized.

The request 114 includes information associated with a user and/or device. In some examples, the information included in the request 114 can be obtained by the application 108 from local device storage (e.g., the memory device 136 and/or storage device 137 of the media playback device 102) or from a data store of the media delivery system 104 (e.g., from account data store 163).

In some embodiments, the request 114 includes at least information associated with the user, such as a user identifier. In some examples, the user identifier can include a user account identifier and/or a particular user identifier. The user account identifier can be a string of numbers and/or letters that identify a user account associated with the media service. A particular user identifier can be a string of numbers and/or letters that identify a particular user associated with the user account. For example, a single user account can be associated with two or more users, where each user has their own associated user identifier. Both the user account identifier and the particular user identifier refer to and/or include identification of the user account of the media service and the subscription type associated with the user account.

In some examples, the user account information can be used by the obfuscation engine 112 to initially determine that the user is entitled to access the feature at this time based on a subscription type of the user account at least matching or exceeding a subscription type needed to access the feature. For example, the request 114 received at operation 202 can be in a "get authorization status" format that triggers that initial determination of whether the user is entitled to access the feature at this time based on the user-specific information included in the request.

In other embodiments, the request 114 can also include information associated with the media playback device 102, such as a device identifier. A device identifier can be a string of numbers and/or letters that identify a device. One example device identifier includes a serial number of the device. A plurality of devices can be associated with each user account. In some embodiments, each device associated with a user account separately sends the request 114 to download the machine learning model, where the request both includes the user- and device-specific information.

The method 200 then proceeds to operation 204, where an obfuscation key is created based on the information that is included in the request, such as the obfuscation key 116 created based on the information in the request 114. For example, creation of the obfuscation key 116 includes generation of a deterministic mapping from the information to the obfuscation key 116 using a hash function or other similar algorithm, for example. Exemplary hash functions that can be implemented include the MD5 message-digest algorithm or the Secure Hash Algorithm 1 (SHA-1). The type of hash functions or algorithms applied for the creation of the obfuscation key 116 are distinct from traditional types of hash functions or algorithms used to create encryption keys.

As discussed above, the information included in the request 114 can include user- and/or device-specific information including a user identifier and/or a device identifier. In one embodiment, where the information includes both the user identifier and the device identifier, the obfuscation key 116 can be derived as a function of the user identifier and the device identifier. For example, a first portion of numbers from the user identifier and a second portion of numbers from the device identifier can be multiplied by one another to yield a value, and a particular number of digits from the right hand side of the yielded value can be used to create the obfuscation key 116. As one illustrative example, the particular number of digits can include at least 95 digits.

Once the obfuscation key 116 is created at operation 204, the method 200 proceeds to operation 206 where a derivative model is generated using a reference copy of the machine learning model and the obfuscation key, such as the derivative model 118. The derivative model 118 is generated to enable access control for the machine learning model once provided to the application 108 executing on the media playback device 102. In other words, the derivative model 118 provided is an access-controlled, on-device machine learning model. The reference copy of the machine learning model can be retrieved from storage of the media delivery system 104 (e.g., from the machine learning model data store 182). The reference copy machine learning model can then be transformed based on the obfuscation key 116 to generate the derivative model 118. As described in more detail with reference to FIG. 4, to generate the derivative model 118, additional model inputs are included that have values derived from the obfuscation key 116, original weights of the model are modified based on those derived values, and operations are then added to the model to essentially cause a reversal of the modified weights to the original weights when correct values are provided as the additional model inputs to model runtime (e.g., the correct values being values derived from the obfuscation key).

The method 200 then ends at operation 208 where the derivative model 118 and the obfuscation key 116 are provided to the application 108. The application 108 can download and save the derivative model 118 locally to the media playback device 102 for persistent storage (e.g., in storage device 137), and the obfuscation key 116 can be temporarily stored in memory (e.g., in memory device 136) while the application 108 remains open on the media playback device 102. Accordingly, upon receiving a selection of the feature 110, the derivative model 118 is able to be run on-device (and function properly) based on the application 108 providing the obfuscation key 116 to the derivative model 118 at runtime. For example, by providing the obfuscation key 116, correct values derived from the obfuscation key 116 are provided as the additional model inputs and the application of the added operations causes the reversal of the modified weights to the original weights. Resultantly, the derivative model functions properly to provide desired output.

Alternatively, if only a portion of the correct values derived from the obfuscation key 116 or completely random values are provided as the additional model inputs to the derivative model 118, at least some or all of the modified weights will not be reversed to the original weights. Resultantly, the derivative model still operates to provide output, but functions improperly by providing output that increasingly diverges from the desired output.

Thus, in contrast from encryption, the obfuscation key-based modifications made to the machine learning model to generate the derivative model 118 do not obscure the structure of the model. As a result, the model in its derivative state is operational on the media playback device 102 even without the obfuscation key 116. However, based on the obfuscation key-based modifications, a quality of the output of the derivative model 118 is affected based on whether the obfuscation key 116 is available and applied at runtime. In other words, the derivative model 118 is always operational, but only practically useful (e.g., to achieve quality output) if the obfuscation key 116 is available and applied to the derivative model 118 at runtime.

Additionally, because the obfuscation key 116 is only temporarily stored and removed from the memory device 136 once the application 108 is closed, each subsequent time the application 108 is run, the obfuscation key has to be re-created and sent to the application 108, which provides an additional form of access control as described in more detail with reference to FIG. 6. As one example, a determination can be made as to whether access to the feature 110, and thus use of the derivative model, is still available before re-creating the obfuscation key 116. Moreover, because the derivative model 118 is significantly larger than the obfuscation key 116 (e.g., several megabytes versus several kilobytes or less), generating and providing the larger derivative model 118 to the application 108 one time for persistent storage on the media playback device 102, reduces processing requirements along with transmission bandwidth.

Further, because the obfuscation key 116 is created based on user- and/or device-specific information that is sent within the application request, if the derivative model 118 was extracted and copied, when an unauthorized user (e.g., not tied to the user account) uses a same type of application to execute the derivative model 118 on a different device, the same user and device information cannot be provided within the request. As a result, the same obfuscation key 116 that was used to generate the derivative model cannot be re-created and provided to the application, which renders the extracted and copied derivative model practically useless although operational.

Figure 4:
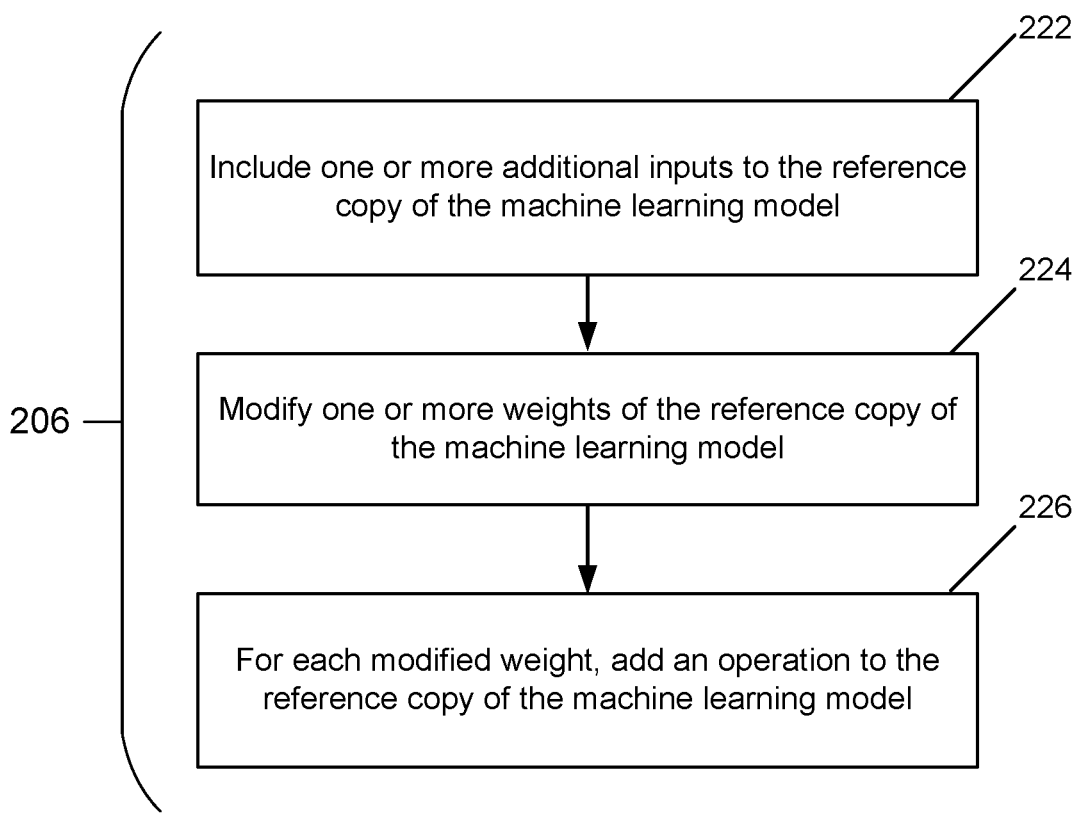
FIG. 4 illustrates an example method for generating a derivative of the machine learning model.

FIG. 4 illustrates an example method 220 for generating a derivative of the machine learning model such as the derivative model 118. In some embodiments, the method 220 can be used to at least partially perform the operation 206 described in FIG. 3 to generate a derivative model 118 using a reference copy of a machine learning model and an obfuscation key 116. In this example, the method 220 is described as being performed by the obfuscation engine 112 of the media delivery system 104 as described in FIG. 1 and FIG. 2.

Method 220 begins at operation 222, where one or more additional inputs are included to the reference copy of the machine learning model. The one or more additional inputs can be obfuscation parameters, and a number of the obfuscation parameters included as inputs can be arbitrary. For example, the number of obfuscation parameters can be any number equal to or less than a number of digits or values within the obfuscation key 116 as described above with reference to operation 204 of method 200 in FIG. 2. As an illustrative example, if the obfuscation key 116 has 95 digits or values, then up to 95 obfuscation parameters can be included as inputs to the reference copy of the machine learning model.

In some examples, each of the obfuscation parameters included is assigned a value that is derived from the obfuscation key 116. In some embodiments, the assigned value is a floating point value. For example, an obfuscation parameter is assigned a floating point value (x) that is derived from a value (y) in the obfuscation key 116 using a formula $x=2^y$, where the value of y can be between −127 and +127. As an illustrative example, if 95 obfuscation parameters are included as inputs to the reference copy of the model and the obfuscation key 116 is 95 values in length, then the values for the obfuscation parameters are assigned 1:1 based on the values of obfuscation key 116 using the formula. For example, a first obfuscation parameter is assigned a first floating point value that is derived from a first value in the obfuscation key 116 using the formula, and a second obfuscation parameter is assigned a second floating point value that is derived from a second value in the obfuscation key 116 using the formula, etc.

This example formula ($x=2^y$) prevents floating point error or precision loss, which enables recovery of the same value for y at runtime (e.g., after the formula is applied) as before the formula was applied. In the example provided above, the value of y can between −127 and +127, however the range of y values can be configurable. In some embodiments, the range of y values can be configurable based on the weights in the machine learning model to further promote such precision and accuracy.

At operation 224, one or more weights of the reference copy of the machine learning model can be modified. The machine learning model, regardless of a type of the machine learning model, includes a plurality of weights or learned parameters (collectively referred to as weights herein). An illustrative example of a neural network and the weights associated with the neural network prior to and after the modification are provided in FIGS. 5A and 5B below.

In some examples, a number of weights that are modified corresponds to a number of the obfuscation parameters that are included as inputs to the reference copy model at operation 222. Continuing the above example, if 95 obfuscation parameters are included as inputs to the reference copy of the model, then 95 weights are modified.

In some embodiments, for each weight to be modified, the weight is modified based on an assigned value of a respective obfuscation parameter that corresponds to the weight, where the assigned value for the obfuscation parameter is the value derived from the obfuscation key 116 as described above. For example, a first operation can be applied to the weight and the assigned value of the respective obfuscation parameter. Exemplary first operations can include addition, subtraction, multiplication, and division, among other operations.

At operation 226, for each modified weight, an operation is added to the reference copy of the machine learning model. The operation can be a second operation that is applied (e.g., at runtime of the model) to the modified weight and a received input for the respective obfuscation parameter. Exemplary second operations can include addition, subtraction, multiplication, and division, among other operations. In some embodiments, the second operation is an inverse operation of the first operation applied to modify the weight, such that this added second operation essentially reverses the modified weight to the original weight when a correct value (e.g., a value derived from the obfuscation key 116 for the respective obfuscation parameter) is received as input for the respective obfuscation parameter. For example, if the first operation is addition, the second operation is subtraction and vice versa. As another example, if the first operation is multiplication, the second operation is division and vice versa.

An operation is added to the reference copy of the machine learning model for each modified weight (e.g., for each of the one or more weights corresponding to the one or more obfuscation parameters). In some examples, an operation added for a first modified weight can be a same operation added for one or more other weights. In other examples, an operation added for each weight can be different from one or more other weights. In other words, in some embodiments, a mixture of operation types can be added among the modified weights, while in other embodiments a same operation type can be added for each of the modified weights.

Accordingly, when the derivative model 118 is provided with the obfuscation key 116 to the application 108 as described with reference to operation 208 of method 200 in FIG. 3, the application 108 can provide the obfuscation key 116 to the derivative model 118 at runtime causing correct values for the obfuscation parameters to be derived from the obfuscation key 116 and provided as input to the derivative model 118. As a result, the modified weights are reversed to the original weights once the added operation for each of the modified weights is applied to the respective modified weights and the correct values received as input for the respective obfuscation parameters. By reversing the modified weights to the original weights, the derivative model 118 behaves as expected to provide desired output.

Figure 5A:
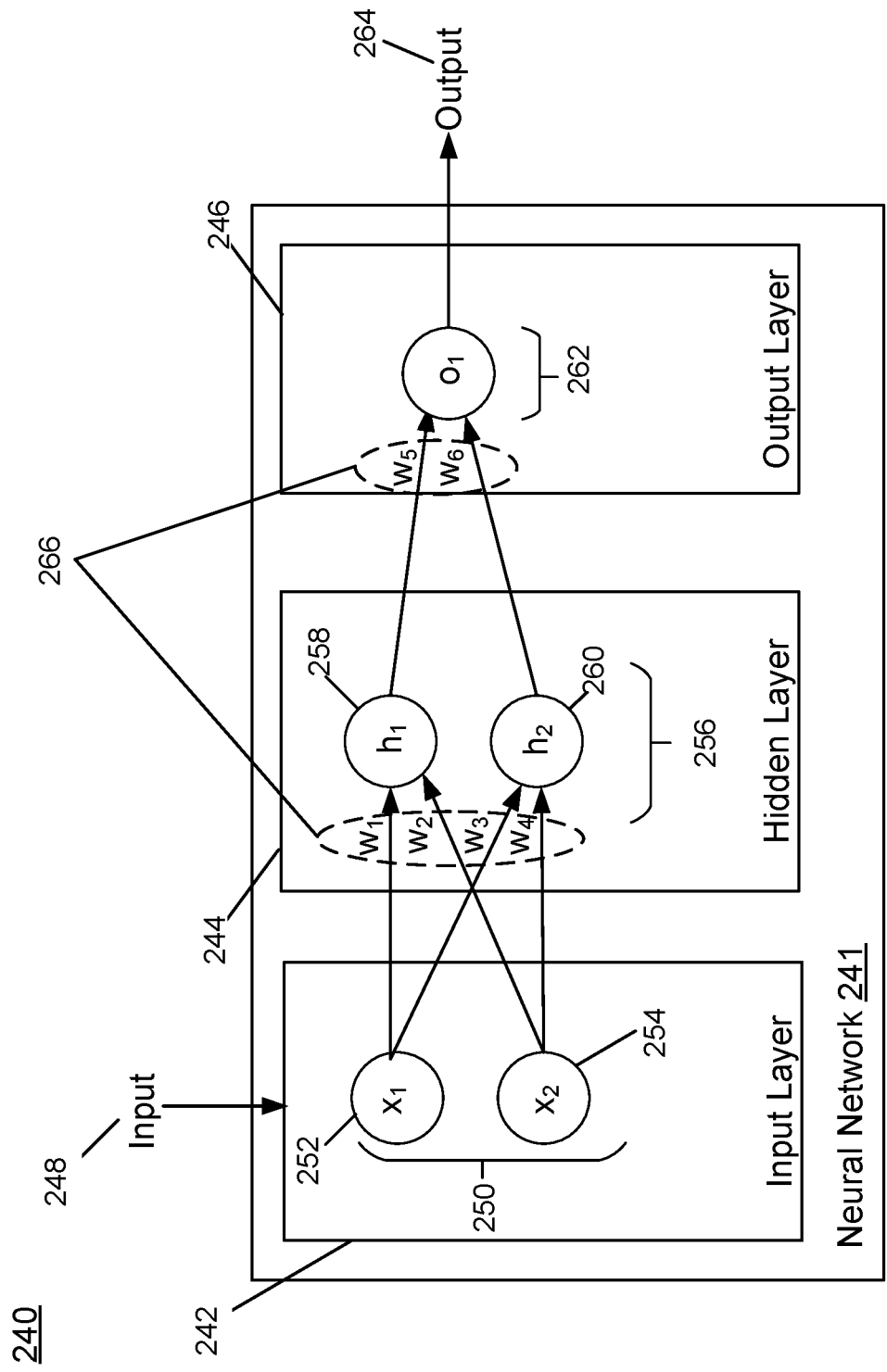
FIG. 5A illustrates a conceptual diagram of an example machine learning model.

FIG. 5A illustrates a conceptual diagram 240 of a machine learning model, such as a neural network 241, that is used by a feature of an application. The neural network 241 is one example type of machine learning model that can be implemented. The neural network 241 can include an input layer 242, one or more hidden layers 244, and an output layer 246.

Input 248 to the neural network 241 is received at the input layer 242, where the input 248 can include a dataset comprised of one or more individual features or inputs. In some examples, each of the inputs are represented by nodes 250 in the input layer 242. In this illustrative example, a first node 252 of the nodes 250 represents a first input ($x_1$) and a second node 254 of the nodes 250 represents a second input ($x_2$).

In some embodiments, each node 250 of the input layer 242 is connected to every other node in the next layer (e.g., nodes 256 of the hidden layer 244). A single hidden layer 244 is shown here for simplicity, however in other examples, the neural network 241 can include a plurality of hidden layers 244. The hidden layer 244 can have a random number of nodes 256. In this illustrative example, the hidden layer 244 includes a first node ($h_1$) 258 and a second node ($h_2$) 260. Each node 256 of the hidden layer 244 can then be similarly connected to every other node in the next layer (e.g., the output layer 246). The output layer 246 can have a number of nodes 262 representative of a number of possible outputs. In this illustrative example, the output layer has a single node 262 indicating a single output (e.g., output 264) is generated by the neural network 241.

Each connection between two nodes has an associated weight that is represented as a value. For example, a connection between the first node 252 of the input layer 242 and the first node 258 of the hidden layer 244 has an associated first weight ($w_1$), and a connection between the second node 254 of the input layer 242 and the first node 260 of the hidden layer 244 has an associated second weight ($w_2$). Similar associated weights, including a third weight ($w_3$), a fourth weight ($w_4$), a fifth weight ($w_5$), and a sixth weight ($w_6$), exist for connections between other nodes of the neural network 241. Each of these associated weights can be collectively referred to as weights 266. The weights 266 are learned parameters of the neural network 241 that affect the amount of influence a change in a particular input will have upon the output.

When the neural network 241 receives an input at a given node 250 in the input layer 242 (e.g., first input ($x_1$) at the first node 252 and second input ($x_2$) at the second node 254), this input is passed to every other node 256 in the hidden layer 244 via the connection, and the input can be multiplied by the respective weight 266 assigned to that connection to yield weighted inputs. For example, at the first node 258 of the hidden layer 244, the first input ($x_1$) received from the first node 252 of the input layer 242 is multiplied by the first weight ($w_1$) to yield a first weighted input and the second input ($x_2$) received from the second node 254 of the input layer 242 is multiplied by the second weight ($w_2$) to yield a second weighted input.

At each node 256 in the hidden layer 244, a sum of the weighted inputs is then computed and passed to an activation function. Continuing the above example, at the first node 258 of the hidden layer 244, the first weighted input and the second weighted input are summed and passed to the activation function. In some embodiments, the weighted inputs are passed into the activation function along with a bias ($b_1$) (not shown in FIG. 2A), where the bias is a constant value (or a constant vector) that is added to the sum of the weighted inputs. The activation function can include a sigmoid activation function, Rectified Linear Unit (ReLU), Scaled Exponential Linear Unit (SeLU), and Tan H, among other examples. A result of the activation function is output by each node 256 in the hidden layer 244, and this output is received as input to every connected node in a next layer. Continuing with the above example, an output of the first node 258 of the hidden layer 244 is received as input to the node 262 in the output layer 246 via the connection having an associated fifth weight ($w_5$).

As the output of each node 256 in the hidden layer 244 is received as input to the node 262 in the output layer 246 via the connection, the input can be multiplied by the respective weight 266 assigned to that connection to yield weighted inputs. At the node 262, a sum of the weighted inputs is then computed and passed to an activation function, as described above. The type of activation function implemented in the output layer 246 can be different from a type of activation function implemented in the hidden layer 244. A result of the activation function is then provided as the output 264 of the neural network 241.

In some embodiments, the neural network 241 is to be an on-device model that is provided to an application executing on a device for persistent storage and running on the device to enable a feature of the application. In such embodiments, a derivative of the neural network 241 can be generated based on a reference copy of the neural network 241 and an obfuscation key. The derivative and obfuscation key are then provided to the application. An example derivative of the neural network 241 is illustrated and described with reference to FIG. 5B.

Figure 5B:
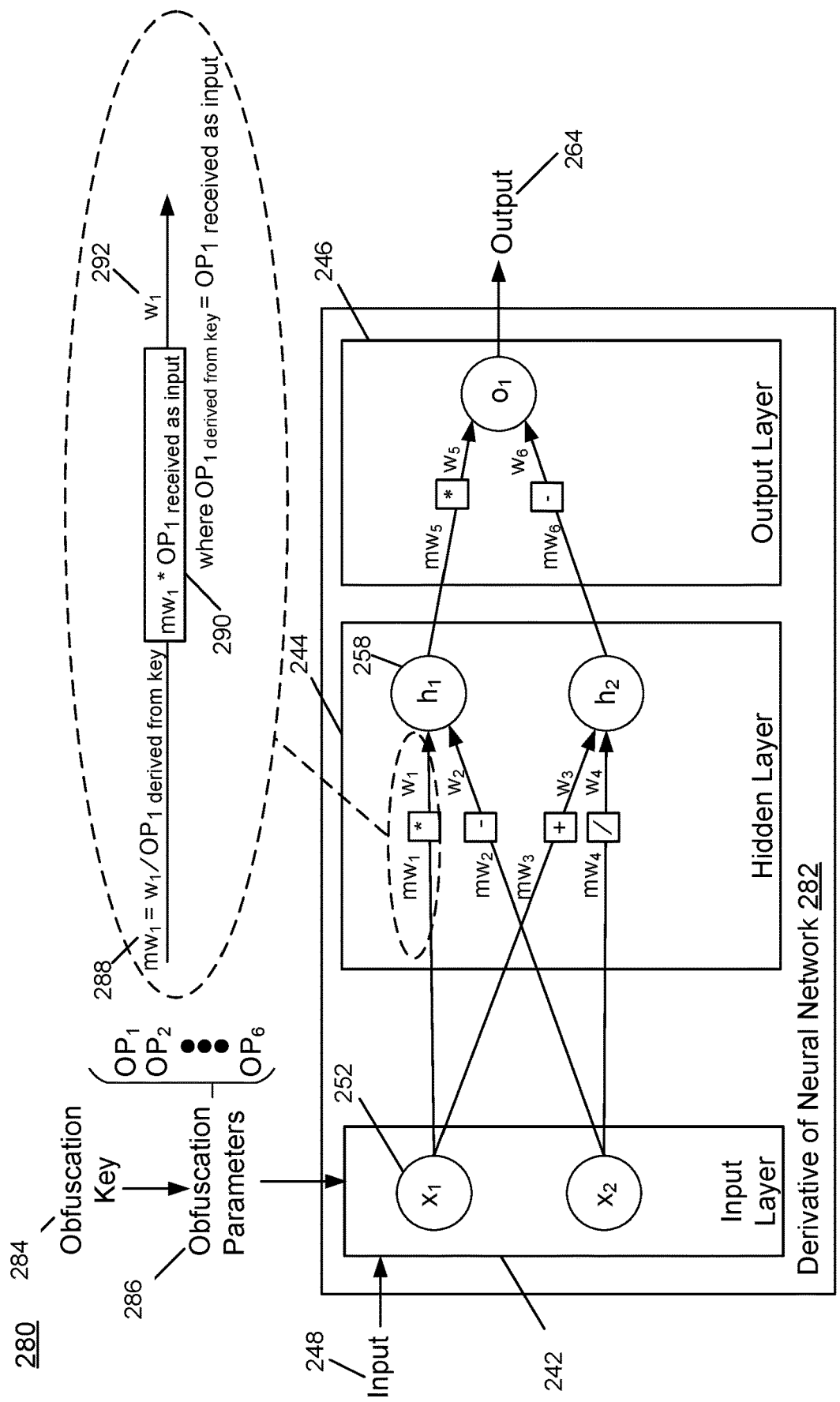
FIG. 5B illustrates a conceptual diagram of providing an obfuscation key during runtime to a derivative model that is generated based on a reference copy of the machine learning model described in FIG. 5A and the obfuscation key.

FIG. 5B illustrates a conceptual diagram 280 of a derivative of the neural network 241 described in FIG. 5A (e.g., derivative model 282) that is generated based on a reference copy of the neural network 241 and an obfuscation key 284 and application of that obfuscation key 284 to the derivative model 282 at runtime on a device.

The derivative model 282 includes one or more obfuscation parameters 286 as inputs (e.g., in addition to the input 248). In some embodiments, the obfuscation parameters 286 have assigned values derived from the obfuscation key 284, as described above in detail with reference to operation 222 of method 220 in FIG. 4. Within the derivative model 282, one or more of the weights 266 (FIG. 5A) can be modified by the assigned value of an obfuscation parameter to yield a modified weight. For example, for each of the obfuscation parameters 286 included, a corresponding number of the weights 266 are modified. In some embodiments, the modification includes a first operation applied to a respective weight and assigned value of a respective obfuscation parameter to yield the modified weight, where the first operation can be addition, multiplication, division, or subtraction, among other examples. As an illustrative example, the first weight ($w_1$) from the weights 266 that is associated with the connection of the first node 252 of the input layer 242 to the first node 258 of the hidden layer 244 is modified by dividing the first weight ($w_1$) by an assigned value for a first obfuscation parameter derived from the obfuscation key 284 ($OP_{1\ derived\ from\ key}$) to yield a modified first weight ($mw_1$) 288.

For each modified weight, the derivative model 282 also includes an added operation. The added operation can be a second operation that is applied to the modified weight and a corresponding value for the obfuscation parameter received as input during runtime of the derivative model 282. In some embodiments, the second operation is an inverse operation of the first operation applied as part of the weight modification to essentially reverse such modification when a correct value derived from obfuscation key 284 is received as input for the respective obfuscation parameter 286 during runtime. Continuing the illustrative example, for the modified first weight ($mw_1$) 288, an operation 290 is added. Because the modified first weight ($mw_1$) 288 is a result of the first operation where the first weight ($w_1$) is divided by the first obfuscation parameter derived from the obfuscation key 284 ($OP_{1\ derived\ from\ key}$), the added operation 290 is a second operation that is inverse of the first operation to multiply the first weight ($mw_1$) 288 by a first obfuscation parameter received as input ($OP_{1\ received\ as\ input}$). Therefore, when at runtime, a value of the first obfuscation parameter received as input ($OP_{1\ received\ as\ input}$) is a same value as the first obfuscation parameter derived from the obfuscation key 284 ($OP_{1\ derived\ from\ key}$), the second operation results in the original first weight ($w_1$) 292 prior to the modification. Accordingly, the first input ($x_1$) from the input 248 received from the first node 252 of the input layer 242 can be multiplied by the original first weight ($w_1$) to yield a first weighted input that is then summed with other weighted inputs at the first node 258 of the hidden layer 244 and passed to the activation function.

By providing an application the derivative model 282 along with the obfuscation key 284, the application can provide that obfuscation key 284 at runtime to the derivative model 282 causing correct values for each of the obfuscation parameters 286 to be derived therefrom and input to the derivative model 282. Resultantly, original weights (e.g., weights 266) are ultimately applied to weight the inputs received at the nodes of each layer (e.g., nodes 256 of the hidden layer 244 and node 262 of the output layer 246), which are then summed and passed to the activation function, which allows the derivative model 282 to function properly.

If only a portion of the values for the obfuscation parameters 286 provided as input are derived from the obfuscation key or random values are assigned to the obfuscation parameters 286, when the added operations are applied at runtime, at least a portion or all of the modified weights will not be reversed to the original weights causing weights other than the learned original weights from being applied to the inputs received at the nodes of each layer. As these weights increasingly diverge from the original weights, the derivative model 282 is able to continue to operate to provide the output 264, however quality or accuracy of the output 264 provided conversely decreases. An example associated with audio output is described with reference to FIG. 8.

While the machine learning model in the example presented in FIGS. 5A and 5B is a neural network, the types of machine learning models from which similar derivative models can be generated are not so limited. In other examples, the machine learning models can include one of the following types of models: a linear regression model, a decision tree model, a random forest model, a logistic regression model, a support vector machine, Naive Bayes, or models employing clustering or dimensionality reduction techniques.

Figure 6:
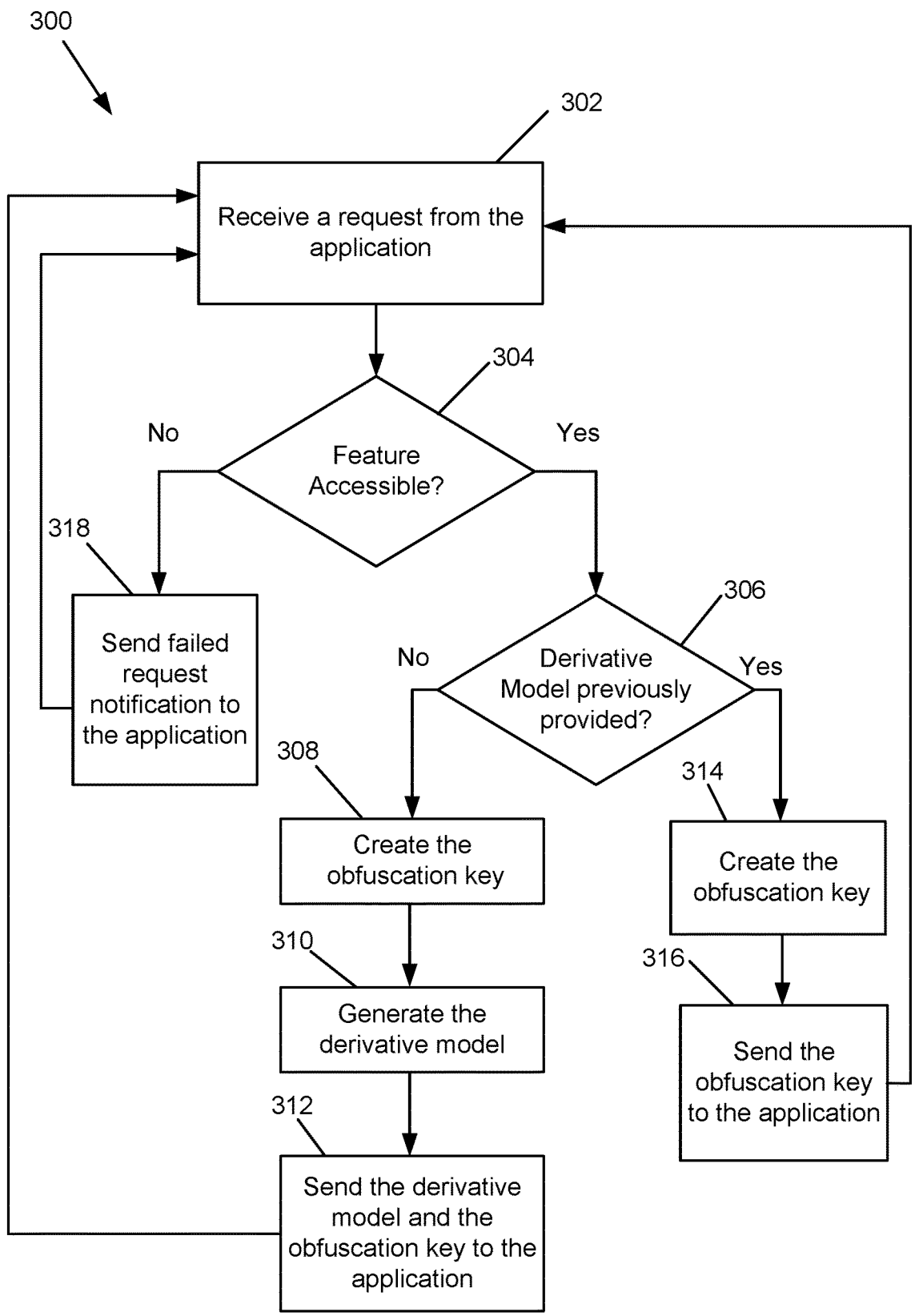
FIG. 6 illustrates an example process flow diagram for controlling use of an on-device machine learning model.

FIG. 6 illustrates an example process flow diagram 300 for controlling use of an on-device machine learning model, such as the derivative model 118. As discussed with reference to FIGS. 1 and 2, once the application 108 initially receives the derivative model 118 and the obfuscation key 116 from the obfuscation engine 112, the application 108 can download and save the derivative model 118 for persistent storage on the media playback device 102 such as in storage device 137. The application 108 can also temporarily store the obfuscation key 116 in the memory device 136 while the application 108 is running on the media playback device 102. Once the application 108 is closed (e.g., is no longer executing), the obfuscation key 116 is erased. Therefore, in order to subsequently use the derivative model 118 in a manner that will provide desired output, another request is sent to the obfuscation engine 112 in order to obtain the obfuscation key 116. Such subsequent requests can be sent in response to a next execution of the application 108 on the media playback device 102 and/or in response to the feature 110 being selected during that next execution. As discussed throughout the disclosure, although the derivative model 118 does not require the obfuscation key 116 to operate or run, the obfuscation key 116 is needed for the derivative model 118 to function properly (e.g., behave as intended).

The process flow diagram 300 illustrates how use of an on-device machine learning model is controlled both for initial and subsequent use (e.g., responsive to initial or subsequent requests). In some examples, the operations and decisions presented in the process flow diagram 300 are performed by the obfuscation engine 112. The process begins at operation 302, where a request is received from an application, such as the request 114 received from the application 108 having the feature 110 that is executing on the media playback device 102. The request 114 is associated with a machine learning model that is used to enable the feature 110 and includes information associated with the user and/or device, such as a user identifier and/or a device identifier. At decision 304, an initial decision is made as to whether the feature 110 is accessible. The decision can be made based on the user-specific information included in the request. As one example, the user identifier can be tied to a user account of a media service providing the application 108, for example, and a subscription type associated with the user account can be used to initially determine whether the user is entitled to access the feature 110 at this time based on a subscription type of the user account at least matching or exceeding a subscription type needed to access the feature 110.

If the feature is accessible based on the decision 304, the process proceeds to decision 306, where a further decision is made as to whether a derivative model, such as the derivative model 118, has been previously provided to the application 108 that is executing on the media playback device 102. In some embodiments, the obfuscation engine 112 stores the user- and/or device-specific information received in requests, such as the request received at operation 302, in the machine learning model data store 182. This allows the obfuscation engine 112 to log and track which user accounts and devices associated with the user accounts have requested and been provided with derivatives of various machine learning models. Therefore, at decision 306, logged data for the derivative model 118 can be referenced using the information received in the request to determine whether or not that user account and the particular media playback device 102 on which the application 108 is executing has been previously provided the derivative model 118.

If the derivative model 118 has not been previously provided based on the decision 306 and thus the request received at operation 302 is an initial request, the process proceeds to operations 308, 310, and 312 to create the obfuscation key 116, generate the derivative model 118, and send the derivative model 118 and the obfuscation key 116 to the application 108, respectively. These operations 308, 310, and 312 correspond to operations 204, 206, and 208 of method 200, which are described above in detail with reference to FIG. 3. In some examples, the user account may have previously sent a request via a same type of application running on a different device than the media playback device 102. However, because the derivative model was provided to and stored on the different device, the derivative model is determined to have not been previously provided at decision 306, and operations 308, 310, and 312 are performed such that a new obfuscation key and new derivative model are provided that are specific to the user account and the particular media playback device 102. The process flow diagram 300 can then return to operation 302 where another request (e.g., a subsequent request) is received from the application 108.

If the derivative model 118 has been previously provided based on the decision 306 and thus the request received at operation 302 is a subsequent request, the process proceeds to operations 314 and 316, where the obfuscation key 116 is created and sent to the application 108, respectively. The obfuscation key 116 created is the same key initially created and used to generate the derivative model 118 that is based on the user- and/or device-specific information. In other words, subsequent requests received from the application 108 can include the same user- and/or device-specific information as the initial request to allow the same obfuscation key 116 to be re-created and provided to the application 108. The process flow diagram 300 can then return to operation 302 where another subsequent request is received from the application 108.

Returning to decision 304, if the feature 110 is determined not to be accessible based on the information included in the request received at operation 302, re-creation and sending of the obfuscation key 116 to the application 108 will be refused. For example, the process proceeds to operation 318 where a failed request notification is sent to the application 108 for display on the media playback device 102. In some examples, the failed request notification can be in a form of an error message that indicates use of the feature 110 is not available. In other examples, the failed request notification can also include information and/or selectable options for gaining access to the feature 110, such as selectable options to upgrade a subscription type associated with the user account to at least meet the tier of subscription type required to gain access. The process flow diagram 300 can then return to operation 302 where another subsequent request is received from the application 108.

In some examples, initially the user account and subscription type associated with a request received at operation 302 may meet the subscription type required to access the feature 110, causing the derivative model 118 and the obfuscation key 116 to be provided on initial use and the obfuscation key 116 to be provided on each subsequent use. However, at a later point in time, the subscription type associated with the user account may change (e.g., be a lower tier with lower access) or a subscription type required to access the feature 110 may be raised to a higher tier. Resultantly, the next time a request associated with that user account is received at operation 302, the failed request notification is provided to the application 108 rather than the obfuscation key 116.

While the derivative model 118 will remain stored on the media playback device 102 meaning it can continue to be operated or run, because the obfuscation key 116 is not provided to the application 108 to be temporarily stored and applied to the derivative model 118 at runtime, the derivative model 118 will not behave as expected when run (e.g., is practically useless) for reasons discussed in detail with reference to FIGS. 5A and 5B. This effectively controls access to the model.

Additionally, the derivative model 118 is significantly larger than the obfuscation key 116 (e.g., several megabytes versus several kilobytes or less). Therefore, by generating and providing the larger derivative model 118 to the application 108 one time for persistent storage on the media playback device 102, processing requirements are reduced along with transmission bandwidth.

Figure 7:
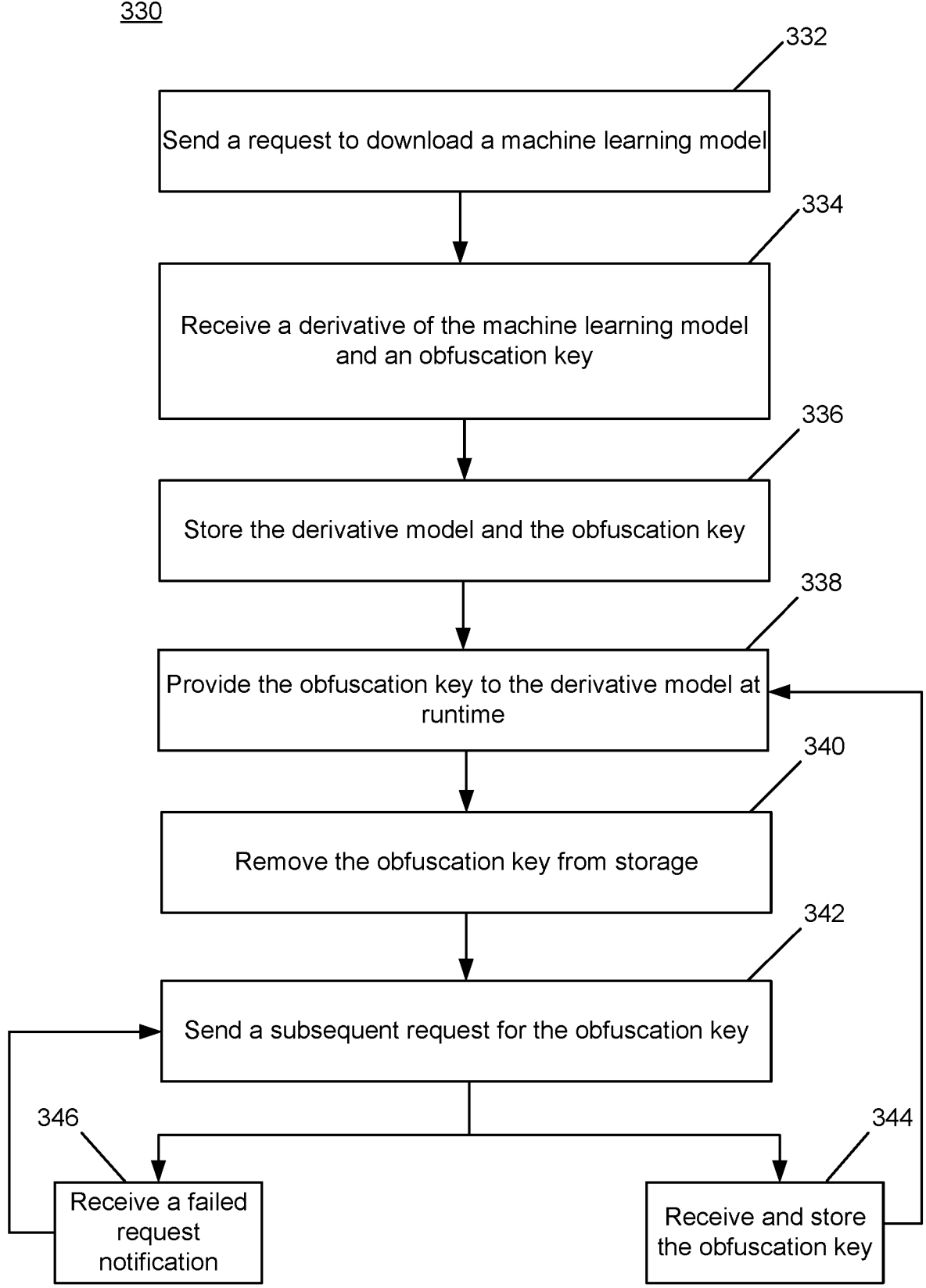
FIG. 7 illustrates an example method performed by a device executing an application to receive, store, and use a machine learning model.

FIG. 7 illustrates an example method 330 performed by a device executing an application to receive, store, and use a machine learning model, such as the application 108 executing on the media playback device 102 that has the feature 110 using a machine learning model.

Method 330 begins at operation 332, where a request to download the machine learning model, such as request 114, is sent from application 108 to the media delivery system 104 over the network 106. The request 114 includes user- and/or device-specific information used by the obfuscation engine 112 of the media delivery system 104 to create an obfuscation key 116 which is further used to generate a derivative model 118 of the machine learning model. The information included in the request 114 can be obtained by the application 108 from local device storage (e.g., the memory device 136 and/or storage device 137 of the media playback device 102) or from a data store of the media delivery system 104 (e.g., from account data store 163). In some embodiments, the request 114 is sent by the application 108 in response to the application 108 opening on the media playback device 102. In other embodiments, the request is sent by the application in response to a selection of the feature 110.

At operation 334, a derivative of the machine learning model and an obfuscation key, such as the derivative model 118 and the obfuscation key 116, are received by the application 108 from the media delivery system 104 over the network 106.

At operation 336, the derivative model 118 and the obfuscation key 116 are stored. The derivative model 118 can be downloaded and saved to local storage of the media playback device 102 (e.g., in storage device 137) such that the derivative model 118 is persistently stored. The obfuscation key 116 can be temporarily stored in the memory device 136 of the media playback device 102 while the application 108 is running.

At operation 338, the obfuscation key 116 can be provided to the derivative model 118 at runtime. For example, in response to a selection of the feature 110 that uses the machine learning model, the derivative model 118 is retrieved from storage to be run on the media playback device 102 and the obfuscation key 116 is provided to the derivative model 118, which enables the derivative model 118 to receive correct inputs derived from the obfuscation key 116 that allow the derivative model 118 to function properly to provide desired output.

At operation 340, the obfuscation key 116 is removed from storage. For example, once the application 108 is closed on the media playback device 102, the obfuscation key 116 is erased from the memory device 136.

At operation 342, a subsequent request is sent. In some embodiments, the subsequent request can be sent in response to a next opening of the application 108 on the media playback device 102. In other embodiments, the subsequent request can be sent in response to a selection of the feature 110 when the application 108 is next opened on the media playback device 102. The subsequent request can include the same user- and/or device-specific information as the request sent at operation 332 that can be used by the obfuscation engine 112 of the media delivery system 104 to re-create the obfuscation key 116.

If the obfuscation key 116 is re-created, at operation 344 the obfuscation key 116 is again received and stored by the application 108 temporarily in the memory device 136 while the application 108 is running. The method 330 can then return to operation 338. Alternatively, if the feature is no longer accessible (e.g., for reasons discussed in detail with reference to FIG. 6), the obfuscation key 116 is not re-created and the method 330 instead proceeds to operation 346, where a failed request notification request is received. The method 330 can then return to operation 342, which is triggered upon a next opening of the application 108 and/or selection of the feature 110 when the application 108 is next opened on the media playback device 102.

Figure 8:
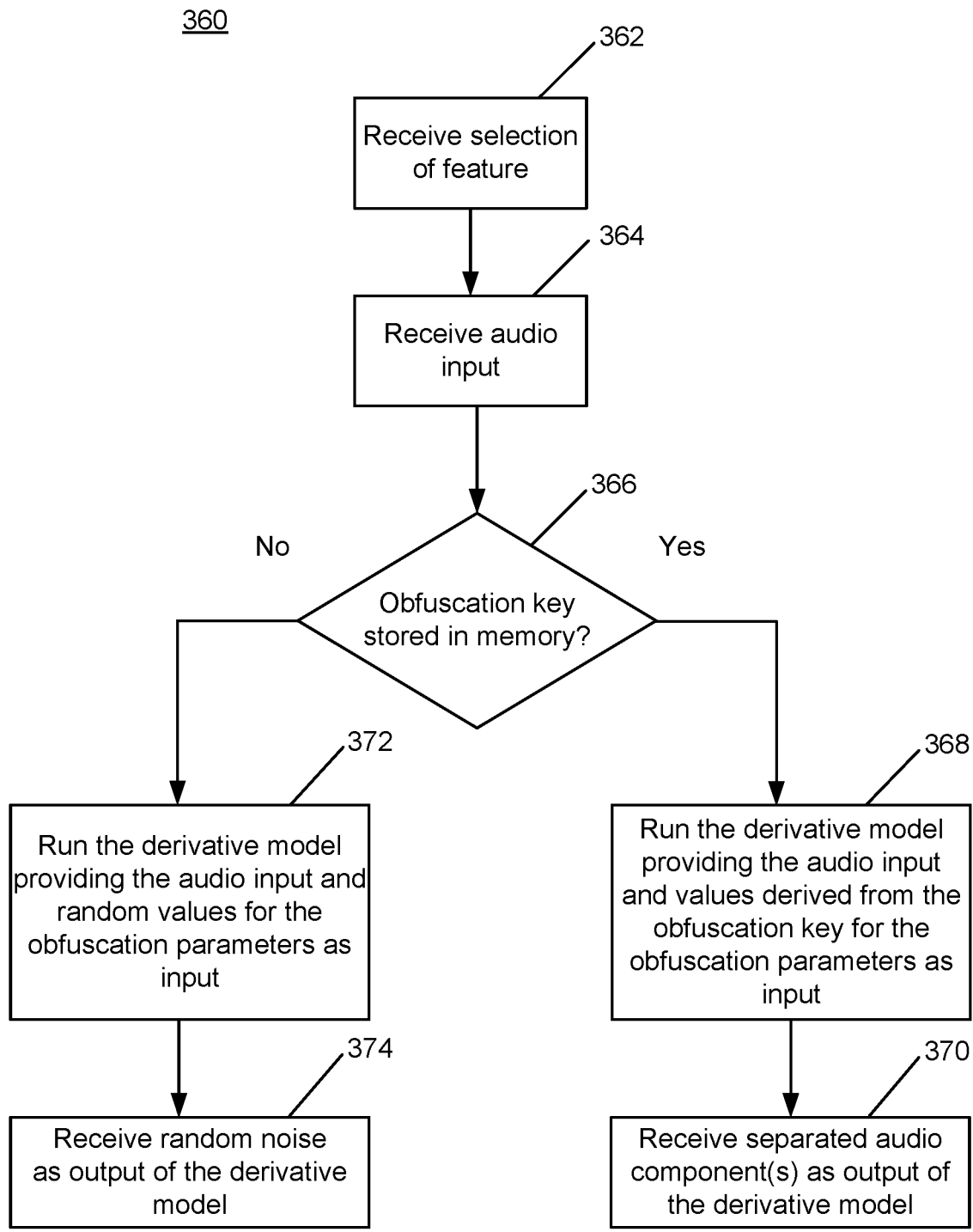
FIG. 8 is a process flow diagram that conceptually illustrates example outputs received from the derivative model.

FIG. 8 is a process flow diagram 360 that conceptually illustrates example output provided by the derivative model 118. In some embodiments, the operations and decisions of the process flow diagram 360 are performed by the application 108 executing on the media playback device 102. In this illustrative example, the application 108 is an audio application and the feature 110 of the application 108 that uses the machine learning model for which the derivative model 118 was generated is associated with vocal separation, which can include separating vocals from non-vocals and vocals from among each other within audio.

The process can begin at operation 362 when a selection of the feature 110 is received. Audio input can then be received at operation 364. In this example, the audio input includes the particular audio for which vocal separation is desired. At decision 366, a determination is made as to whether the obfuscation key 116 is stored in memory (e.g., in the memory device 136 where the obfuscation key 116 is being temporarily stored while the application 108 is running).

If at decision 366, a determination is made that the obfuscation key 116 is stored in memory, the process can proceed to operation 368. At operation 368, the derivative model 118 is run by providing the audio input received at operation 364 along with values derived from the obfuscation key 116 for the obfuscation parameters as input to the derivative model 118.

Based on the received input for the obfuscation parameters being the values derived from the obfuscation key, weights modified by the values derived from the obfuscation key in the derivative model 118 can be reversed by the operations added for each modified weight to result in the original weights of the machine learning model. Accordingly, the derivative model 118 functions properly and one or more separated audio components (e.g., one or more separated vocal and non-vocal components) based on the audio input are received as output of the derivative model at operation 370.

Alternatively, if at decision 366, a determination is made that the obfuscation key 116 is not stored in memory, the process can proceed to operation 372. At operation 372, the derivative model 118 is run by providing the audio input received at operation 364 along with random values for the obfuscation parameters as input to the derivative model 118. Based on the received input for the obfuscation parameters being random values, weights modified by the values derived from the obfuscation key in the derivative model 118 will not be reversed by the operations added for each modified weight causing the weights to vary from the original weights of the machine learning model. Accordingly, although the derivative model 118 can be run, the derivative model 118 functions improperly due to the variance from the original weights and thus produces audio output of lesser quality and accuracy. For example, random noise can be received as output of the derivative model at operation 374. While the output of lesser quality and accuracy is described as random noise in this example, it is not so limited. In other embodiments, the audio output of lesser quality and accuracy can alternatively include no audio at all (e.g., silence), distortion, or random artifacts, among other examples.

While the above description primarily discusses example audio-based applications, the types of applications having features that use machine learning models and apply those models on-device are not so limited. Similar methods and processes as those described herein can be applied by systems associated with these other types of applications to implement access-controlled, on-device machine learning models.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

The invention claimed is:

1. A method for controlling access to an on-device machine learning model, the method comprising:
   receiving, from an application executing on a device of a user, a request to download a machine learning model to the device for enabling a feature of the application, the request including information associated with the user and the device;
   creating an obfuscation key based on the information included in the request;
   generating a derivative model using a reference copy of the machine learning model and the obfuscation key by:
      including one or more obfuscation parameters as inputs to the reference copy of the machine learning model in addition to a dataset input to the reference copy of the machine learning model, each of the one or more obfuscation parameters having an assigned value derived from the obfuscation key;
      modifying one or more weights of the reference copy of the machine learning model with the assigned value of a respective obfuscation parameter; and
      for each of the one or more modified weights, adding an operation to the reference copy of the machine learning model, wherein the operation is to be applied, at runtime, to the modified weight and a received input for the respective obfuscation parameter;
   sending the derivative model and the obfuscation key to the application;
   persistently storing the derivative model in a storage of the device;
   accessing the derivative model by the application using the obfuscation key;
   once the application is closed on the device of the user:
      removing the obfuscation key from the storage of the device by the application;
   once the application is re-opened on the device of the user:
      receiving a re-created obfuscation key by the application; and
      accessing the derivative model persistently stored in the storage of the device by the application using the re-created obfuscation key.

2. The method of claim 1, wherein creating the obfuscation key based on the information included in the request includes generating a deterministic mapping from the information to the obfuscation key.

3. The method of claim 1, wherein the information included in the request includes at least one of a user identifier and a device identifier.

4. The method of claim 1, wherein modifying the one or more weights of the reference copy of the machine learning model with the assigned value of the respective obfuscation parameter includes, for each of the one or more weights, applying a first operation to the weight and the assigned value of the respective obfuscation parameter to yield a modified weight.

5. The method of claim 4, wherein adding the operation to apply to the modified weight and the received input for the respective obfuscation parameter includes adding a second operation that is an inverse operation of the first operation.

6. The method of claim 1, wherein upon receipt by the application, the derivative model is downloaded and saved to storage of the device, and the obfuscation key is temporarily stored in a memory of the device while the application is executing.

7. The method of claim 1, further comprising:
determining the feature is accessible to the user of the device upon receiving the request.

8. The method of claim 1, further comprising:
receiving, from the application, another request including the information associated with the user and the device;
determining the feature is accessible to the user of the device;
re-creating the obfuscation key based on the information included in the request; and
sending the obfuscation key to the application.

9. The method of claim 1, further comprising:
receiving, from the application, another request including the information associated with the user and the device;
determining the feature is inaccessible to the user of the device; and
refusing to re-create and send the obfuscation key to the application.

10. The method of claim 9, wherein refusing to re-create and send the obfuscation key to the application includes sending a failed request notification to the application.

11. The method of claim 1,
wherein the dataset input is audio data;
wherein audio data is provided as input along with values for the one or more obfuscation parameters to the derivative model at runtime; and
wherein the derivative model is not decrypted prior to runtime.

12. The method of claim 11, wherein when the obfuscation key is provided to the derivative model at runtime on the device:
correct values derived from the obfuscation key are received as input for the one or more obfuscation parameters such that applying the operation added for each of the one or more modified weights to the respective modified weight and the received input for the respective obfuscation parameter results in a same value as the respective weight prior to modification; and
the resulting weight causes the derivative model to function properly to provide correct audio as output based on the audio data provided as input.

13. The method of claim 12,
wherein the derivative model is configured to produce audio output;
wherein when the derivative model is run on the device without the obfuscation key:
incorrect values are received as input for the one or more obfuscation parameters such that applying the operation added for each of the one or more modified weights to the respective modified weight and the received input for the respective obfuscation parameter results in a value that differs from the respective weight prior to modification, and
the resulting weight causes the audio output to diverges from the correct audio.

14. A server for controlling access to an on-device machine learning model, the server comprising:
at least one processing device; and
memory coupled to the at least one processing device and storing instructions, that when executed by the at least one processing device, cause the at least one processing device to:
receive, from an application executing on a device of a user, a request to download a machine learning model to the device for enabling a feature of the application, the request including information associated with the user and the device;
create an obfuscation key based on the information included in the request;
generate a derivative model using a reference copy of the machine learning model and the obfuscation key by:
including one or more obfuscation parameters as inputs to the reference copy of the machine learning model, each of the one or more obfuscation parameters having an assigned value derived from the obfuscation key;
modifying one or more weights of the reference copy of the machine learning model with the assigned value of a respective obfuscation parameter; and
for each of the one or more modified weights, adding an operation to reference copy of the machine learning model, wherein the operation is to be applied, at runtime, to the modified weight and a received input for the respective obfuscation parameter; and
send the derivative model and the obfuscation key to the application;
persistently store the derivative model in a storage of the device;
access the derivative model by the application using the obfuscation key;
once the application is closed on the device of the user:
remove the obfuscation key from the storage of the device by the application;
once the application is re-opened on the device of the user:
receive a re-created obfuscation key by the application; and
access the derivative model persistently stored in the storage of the device by the application using the re-created obfuscation key.

15. The server of claim 14, wherein to modify the one or more weights of the reference copy of the machine learning model with the assigned value of the respective obfuscation parameter, the at least one processing device is caused to, for each of the one or more weights, apply a first operation to the weight and the assigned value of the respective obfuscation parameter to yield a modified weight.

16. The server of claim 15, wherein to add the operation to apply to the modified weight and the received input for the respective obfuscation parameter, the at least one processing device is further caused to add a second operation that is an inverse operation of the first operation.

17. The server of claim 14, wherein the obfuscation key is removed from the storage in a memory of the device, and the at least one processing device is further caused to:
receive, from the application, another request including the information associated with the user and the device;
determine whether the feature is accessible to the user of the device; and
if the feature is determined to be accessible, determine the derivative model has previously been provided to the application, re-create the obfuscation key based on the information included in the request, and send the obfuscation key to the application for provision to the derivative model at runtime, else refuse to re-create and send the obfuscation key to the application.

18. Non-transitory computer readable storage media storing executable instructions which, when executed by at least one processing device, cause the at least one processing device to:
- receive, from an application executing on a device of a user, a request to download a machine learning model to the device for enabling a feature of the application, the request including information associated with the user and the device;
- create an obfuscation key based on the information included in the request;
- generate a derivative model using a reference copy of the machine learning model and the obfuscation key by:
  - including one or more obfuscation parameters as inputs to the reference copy of the machine learning model in addition to a dataset input to the reference copy of the machine learning model, each of the one or more obfuscation parameters having an assigned value derived from the obfuscation key;
  - modifying one or more weights of the reference copy of the machine learning model with the assigned value of a respective obfuscation parameter; and
  - for each of the one or more modified weights, adding an operation to the reference copy of the machine learning model, wherein the operation is to be applied, at runtime, to the modified weight and a received input for the respective obfuscation parameter; and
- send the derivative model and the obfuscation key to the application;
- persistently store the derivative model in a storage of the device;
- access the derivative model by the application using the obfuscation key;
- once the application is closed on the device of the user:
  - remove the obfuscation key from the storage of the device by the application;
- once the application is re-opened on the device of the user:
  - receive a re-created obfuscation key by the application; and
  - access the derivative model persistently stored in the storage of the device by the application using the re-created obfuscation key.

19. The non-transitory computer readable storage media of claim 18, wherein the request is received in response to at least one of an opening of the application on the device and a selection of the feature within the application on the device.

20. The non-transitory computer readable storage media of claim 18, wherein the obfuscation key is removed from the storage in a memory of the device, and the at least one processing device is further caused to:
- receive, from the application, another request including the information associated with the user and the device;
- determine whether the feature is accessible to the user of the device; and
- if the feature is determined to be accessible, determine the derivative model has previously been provided to the application, re-create the obfuscation key based on the information included in the request, and send the obfuscation key to the application for provision to the derivative model at runtime, else refuse to re-create and send the obfuscation key to the application.

* * * * *